United States Patent
Chang

(10) Patent No.: US 9,964,802 B2
(45) Date of Patent: May 8, 2018

(54) BACKLIGHT MODULES AND LIQUID CRYSTAL DEVICES

(71) Applicant: Shenzhen China Star Optoelectronics Technology Co., Ltd., Shenzhen, Guangdong (CN)

(72) Inventor: Jianyu Chang, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 168 days.

(21) Appl. No.: 15/106,293

(22) PCT Filed: Mar. 23, 2016

(86) PCT No.: PCT/CN2016/077107
§ 371 (c)(1),
(2) Date: Jun. 18, 2016

(87) PCT Pub. No.: WO2017/152435
PCT Pub. Date: Sep. 14, 2017

(65) Prior Publication Data
US 2018/0101063 A1    Apr. 12, 2018

(30) Foreign Application Priority Data
Mar. 10, 2016  (CN) ......................... 2016 1 0136092

(51) Int. Cl.
*G02F 1/1335*    (2006.01)

(52) U.S. Cl.
CPC .. *G02F 1/133603* (2013.01); *G02F 1/133606* (2013.01); *G02F 1/133615* (2013.01)

(58) Field of Classification Search
CPC ......... G02F 1/133603; G02F 1/133606; G02F 1/133615; G02F 1/1336; G02B 6/0013;
(Continued)

(56) References Cited

U.S. PATENT DOCUMENTS 6,481,130 B1* 11/2002 Wu ......................... F21V 13/04
362/297
7,384,178 B2    6/2008 Sumida et al.
(Continued)

FOREIGN PATENT DOCUMENTS

| CN | 202647443 U | 6/2012 |
| CN | 103047586 A | 4/2013 |

(Continued)

*Primary Examiner* — Bao Q Truong
(74) *Attorney, Agent, or Firm* — Andrew C. Cheng

(57) ABSTRACT

The present disclosure relates to a backlight module and a liquid crystal device. The backlight module includes a LED light source and a lens bar. The LED light source is arranged on the LED substrate and includes a plurality of LED lamps encapsulated by CSP. The lens bar is arranged in the front of the LED light source and includes a plurality of chambers. Internal walls of the chambers are parabola-shaped curved surfaces. Each of the LED lamps is arranged in a rim of a focal point formed by the parabola-shaped curved surface such that the curved surface above the LED lamps is symmetrical to that below the LED lamps. With such configuration, the LED light source encapsulated by the CSP may be incorporated in edge-type BLU so as to avoid the optical leakage issue.

17 Claims, 3 Drawing Sheets

(58) Field of Classification Search
CPC .... G02B 6/0023; G02B 6/003; G02B 6/0031; G02B 6/0073; G02B 6/0068; G02B 6/0086; F21V 5/007
See application file for complete search history.

(56) References Cited

U.S. PATENT DOCUMENTS

| | | | |
|---|---|---|---|
| 8,794,810 B2* | 8/2014 | Park | G02B 6/003 362/608 |
| 2005/0030960 A1 | 2/2005 | Sumida et al. | |
| 2005/0195339 A1 | 9/2005 | Saitoh et al. | |
| 2008/0062715 A1* | 3/2008 | Park | G02B 6/003 362/612 |
| 2010/0059767 A1* | 3/2010 | Kawasaki | G02B 6/0096 257/89 |
| 2015/0003107 A1* | 1/2015 | Kang | G02B 6/0011 362/611 |

FOREIGN PATENT DOCUMENTS

| | | |
|---|---|---|
| CN | 204347395 U | 5/2015 |
| CN | 105333334 A | 2/2016 |
| TW | 201033649 A | 10/2014 |

* cited by examiner

BACKLIGHT MODULES AND LIQUID CRYSTAL DEVICES

BACKGROUND OF THE INVENTION

1. Field of the Invention

The present disclosure relates to liquid crystal display technology, and more particularly to a backlight module and a liquid crystal device (LCD).

2. Discussion of the Related Art

Currently, backlit of LCDs generally adopt light emitting diode (LED) as a light source. The back light unit (BLU) of edge-type may include: a light, such as LED, a light guiding plate for transmitting light beams to provide a surface light source, optical films above the light guiding plate, and a reflective sheet below a bottom of the light guiding plate.

Currently, with the technology development, the optical components, such as the light source, have been updated continuously. With respect to the direct-lit BLU, chip scale package (CSP) has been widely adopted. The CSP adopts flip chip solution, which may greatly increase the driving voltage of LED so as to enhance the lightness value of the LED. Incorporating with other solutions, the number of the LEDs may be reduced, and so does the cost.

However, there are several issue with respect to the CSP. First, there is no support within the package, and thus the chip may be easily damaged. Second, the package may emit the light beams from five surfaces, and thus it is difficult to control the optical path, which results in optical leakage. In view of the above, though cost of the CSP is low, the CSP is not applicable for the edge-type BLU. In addition, when the number of the light sources is reduced, the hotspot issue may occur at the light incident side, which affects the display performance.

SUMMARY

The present disclosure relates to a backlight module and a LCD for enhancing the optical utilization when the CSP is incorporated into the edge-type BLU. In addition, the optical leakage issue may be resolved.

In one aspect, a backlight module includes: a LED light source arranged on a LED substrate, the LED light source includes a plurality of LED lamps encapsulated by chip scale package (CSP); a lens bar configured in a front of the LED light source, the lens bar includes a plurality of chambers, internal walls of the chambers are parabola-shaped curved surfaces, each of the LED lamps is arranged in a rim of a focal point formed by the parabola-shaped curved surface such that the curved surface above the LED lamp is symmetrical to the curved surface below the LED lamp, when the LED lamps emit light beams toward a plurality of directions, the chamber aggregates the light beams in the front of the chamber so as to be emitted out; and wherein the parabola-shaped curved surfaces are made by high-reflective-rate materials, and the front of the lens bar is made by polymeric materials with high light transmittance.

Wherein the front of the lens bar is made by PMMA or PC.

Wherein the front of the lens bar is coated with a thin film for diffusing the light beams.

Wherein the thin film is a transflective film.

Wherein the backlight module further includes a light guiding plate arranged in a rim of a lateral side of the lens bar.

Wherein the backlight module further includes a reflective sheet arranged below a bottom of the light guiding plate.

Wherein the backlight module further includes at least one optical film arranged above a top surface of the light guiding plate.

In another aspect, a backlight module includes: a LED light source arranged on a LED substrate, the LED light source includes a plurality of LED lamps encapsulated by chip scale package (CSP); and a lens bar configured in a front of the LED light source, the lens bar includes a plurality of chambers, internal walls of the chambers are parabola-shaped curved surfaces, each of the LED lamps is arranged in a rim of a focal point formed by the parabola-shaped curved surface such that the curved surface above the LED lamp is symmetrical to the curved surface below the LED lamp, when the LED lamps emit light beams toward a plurality of directions, the chamber aggregates the light beams in the front of the chamber so as to be emitted out.

Wherein the parabola-shaped curved surfaces are made by high-reflective-rate materials.

Wherein the front of the lens bar is made by polymeric materials with high light transmittance.

Wherein the front of the lens bar is made by PMMA or PC.

Wherein the front of the lens bar is coated with a thin film for diffusing the light beams.

Wherein the thin film is a transflective film.

Wherein the backlight module further includes a light guiding plate arranged in a rim of a lateral side of the lens bar.

Wherein the backlight module further includes a reflective sheet arranged below a bottom of the light guiding plate.

Wherein the backlight module further includes at least one optical film arranged above a top surface of the light guiding plate.

In another aspect, a LCD includes any one of the above backlight modules.

In view of the above, the backlight module includes a LED light source and a lens bar. The LED light source is arranged on the LED substrate. The LED light source includes a plurality of LED lamps encapsulated by CSP. The lens bar is arranged in the front of the LED light source. The lens bar includes a plurality of chambers. Internal walls of the chambers are parabola-shaped curved surface. Each of the LED lamps is arranged in a rim of a focal point formed by the parabola-shaped curved surface such that the curved surface above the LED lamps is symmetrical to that below the LED lamps. When the LED lamps emits light beams toward a plurality of directions, the chamber aggregates the light beams in a front of the chamber so as to be emitted out. The cost may be reduced by adopting the CSP. Also, the LED light source encapsulated by the CSP may be incorporated in edge-type BLU so as to realize thin and light design.

DETAILED DESCRIPTION OF THE EMBODIMENTS

Embodiments of the invention will now be described more fully hereinafter with reference to the accompanying drawings, in which embodiments of the invention are shown.

Figure 1:
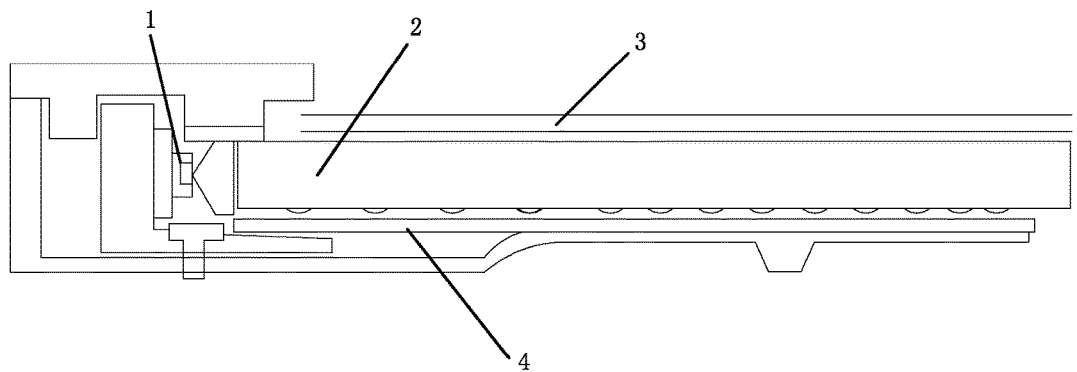
FIG. 1 is a schematic view of the edge-type BLU of one conventional LCD.
Figure 2:
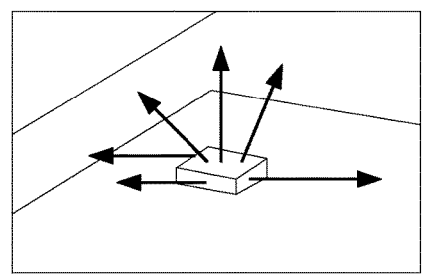
FIG. 2 is a schematic view of the LED of one conventional CSP, and wherein the light beams are emitted out from five surfaces.

Currently, the backlit adopted by LCDs is LED, and the structure is shown in FIG. 1.

The BLU includes a light source 1, a light guiding plate 2, at least one optical film 3, and a reflective sheet 4. The light source 1 may be LED. The light guiding plate 2 is configured for transmitting the light beams to convert the dot light source into a surface light source. The optical film 3 is arranged above a top surface of the light guiding plate 2. The reflective sheet 4 is arranged below the light guiding plate 2.

With respect to the direct-lit BLU, chip scale package (CSP) has been widely adopted. The CSP adopts flip chip solution, which may greatly increase the driving voltage of LED so as to enhance the lightness value of the LED. Incorporating with other solutions, the number of the LEDs may be reduced, and so does the cost.

However, there are several issue with respect to the CSP. First, there is no support within the package, and thus the chip may be easily damaged. Second, the package may emit the light beams from five surfaces, and thus it is difficult to control the optical path, which results in optical leakage. Thus, although the cost of CSP is low, but the CSP is not applicable for the edge-type BLU.

In the present disclosure, the structure of the BLU is changed such that the CSP may be incorporate in the edge-type BLU.

Figure 3:
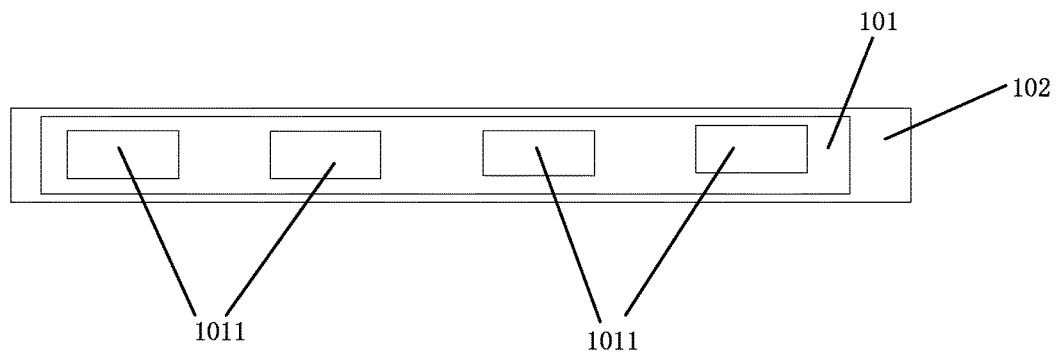
FIG. 3 is a schematic view of the backlight module in accordance with one embodiment.
Figure 4:
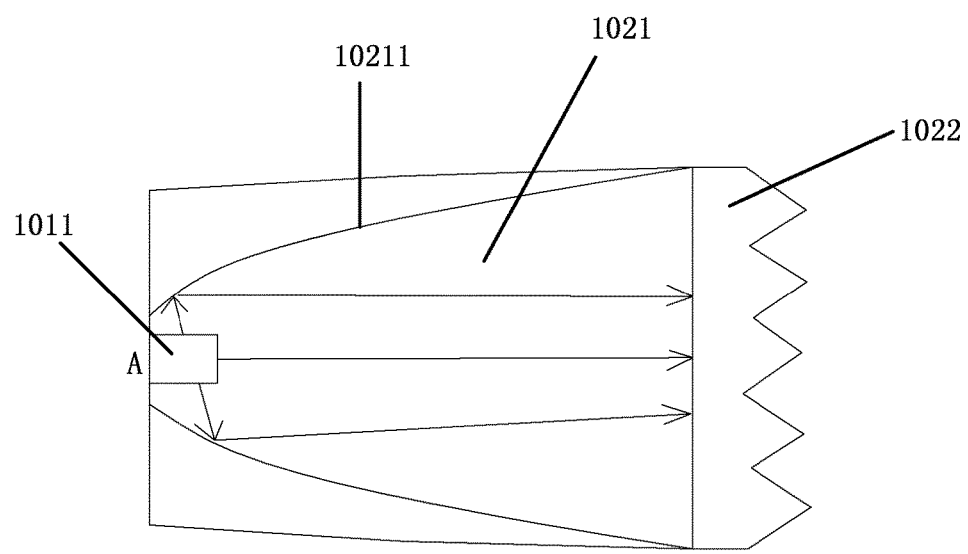
FIG. 4 is a schematic view of the backlight module in accordance with another embodiment.
Figure 5:
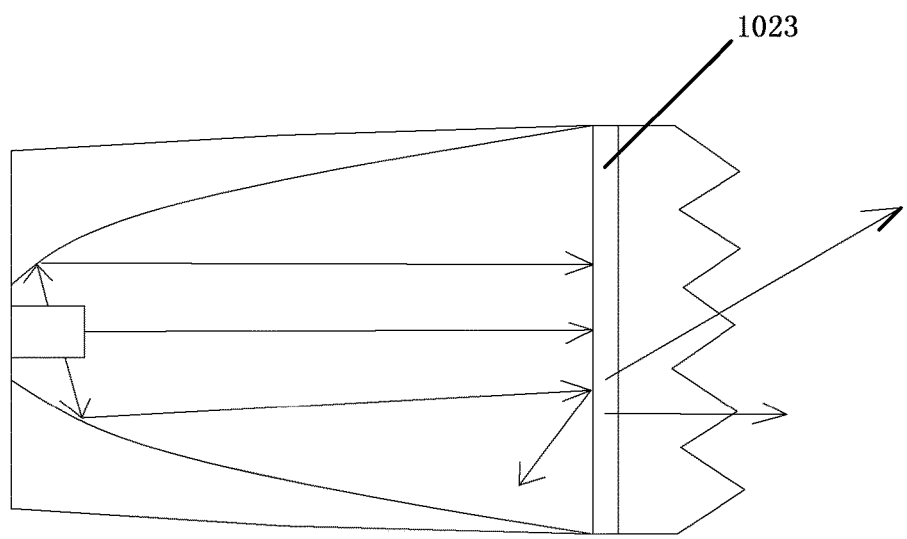
FIG. 5 is a schematic view of the backlight module in accordance with another embodiment.

Referring to FIGS. 3-5, the backlight module 10 includes a LED light source 101 and a lens bar 102. The LED light source 101 is arranged on a LED substrate. The LED includes a plurality of LED lamps 1011 encapsulated by CSP. The lens bar 102 is arranged in front of the LED light source 101. The lens bar 102 includes a plurality of chambers 1021. Internal walls 10211 of the chambers 1021 are parabola-shaped curved surfaces. Each of the LED lamps 1011 is arranged in a rim of a focal point (A) formed by the parabola-shaped curved surface such that the curved surface above the LED lamps 1011 is symmetrical to that below the LED lamps 1011. When the LED lamps 1011 emits light beams toward a plurality of directions, the chamber 1021 aggregates the light beams in a front of the chamber 1021 so as to be emitted out.

Each of the chambers 1021 is configured with parabola-shaped curved surfaces. With such configuration, the light beams emitted from lateral sides of the LED light source 101 packaged by CSP are aggregated in the front of the light source so as to be emitted out. As shown in FIG. 4, the lines with arrows indicate the light beams and the directions of the light beams. In this way, the light beams may be effectively utilized so as to resolve the optical leakage issue.

The parabola-shaped curved surfaces may be made by high-reflective-rate materials. The reflection of the light beams relates to the process that the direction of the light beams is changed when the light beams are propagated within two materials and then the light beams return to the original material. The reflective rate relates to the ratio of the intensity of the reflected light beams and the intensity of the incident light beams. The surfaces of different materials are of different reflective rate, which is represented by percentage. The light beams with different wavelengths, though made by the same materials, may have different reflective rates. In one embodiment, the high-reflective-rate materials having the reflective rate greater than or equals to 0.5 may be selected, such as plastic wall paper, mixed paint, mirror glass, and metallic materials. The light beams may be effectively utilized and the optical leakage may be avoided by selecting the high-reflective-rate materials.

As shown in FIG. 4, the materials of the front of the lens bar 102 may be polymeric materials with high light transmittance 1022, which allow emergent light to pass through as much as possible such that the light beams may be effectively utilized. Specifically, the front of the lens bar 102 may be made by PMMA or PC.

Further, the structure of the front of the lens bar 102 may be configured to enhance the optical diffusion. With the configuration, the number of the LED may be decreased, and the hotspot issue may be avoided due to the uniform light beams.

As shown in FIG. 5, the front of the lens bar 102 is coated with a thin film 1023 for diffusing the light beams. Further, the thin film 1023 may be a transflective film. With such configuration, the diffusion of the light beams may be enhanced such that the mixing uniformity may be enhanced.

Figure 6:
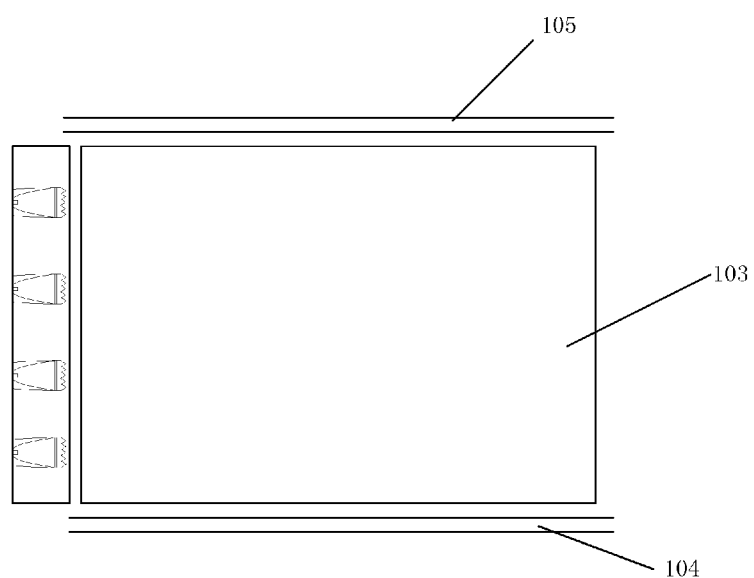
FIG. 6 is a schematic view of the backlight module in accordance with another embodiment.

Referring to FIG. 6, the backlight module further includes a light guiding plate 103, a reflective sheet 104, and at least one optical film 105. The light guiding plate 103 is arranged in a lateral side of the lens bar 102. The reflective sheet 104 is arranged blow the light guiding plate 103. At least one optical film 105 is arranged on a top surface of the light guiding plate 103. In one embodiment, the lens bar 102 and the light guiding plate 103 may be integrated, and the chambers 1021 is arranged at a lateral side of the light guiding plate 103.

According to the present disclosure, the LCD includes any one of the above backlight modules.

In view of the above, the backlight module includes a LED light source and a lens bar. The LED light source is arranged on the LED substrate. The LED light source includes a plurality of LED lamps encapsulated by CSP. The lens bar is arranged in the front of the LED light source. The lens bar includes a plurality of chambers. Internal walls of the chambers are parabola-shaped curved surfaces. Each of the LED lamps is arranged in a rim of a focal point formed by the parabola-shaped curved surface such that the curved surface above the LED lamps is symmetrical to that below the LED lamps. When the LED lamps emits light beams toward a plurality of directions, the chamber aggregates the light beams in a front of the chamber so as to be emitted out. The cost may be reduced by adopting the CSP. Also, the LED light source encapsulated by the CSP may be incorporated in edge-type BLU so as to realize thin and light design.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module, comprising:
a LED light source arranged on a LED substrate, the LED light source comprises a plurality of LED lamps encapsulated by chip scale package (CSP);
a lens bar configured in a front of the LED light source, the lens bar comprises a plurality of chambers, internal walls of the chambers are parabola-shaped curved surfaces, each of the LED lamps is arranged in a rim of a focal point formed by the parabola-shaped curved surface such that the curved surface above the LED lamp is symmetrical to the curved surface below the LED lamp, when the LED lamps emit light beams toward a plurality of directions, the chamber aggregates the light beams in the front of the chamber so as to be emitted out; and
wherein the parabola-shaped curved surfaces are made by high-reflective-rate materials, and the front of the lens bar is made by polymeric materials with high light transmittance.

2. The backlight module claimed in claim 1, wherein the front of the lens bar is made by PMMA or PC.

3. The backlight module claimed in claim 1, wherein the front of the lens bar is coated with a thin film for diffusing the light beams.

4. The backlight module claimed in claim 3, wherein the thin film is a transflective film.

5. The backlight module claimed in claim 1, wherein the backlight module further comprises a light guiding plate arranged in a rim of a lateral side of the lens bar.

6. The backlight module claimed in claim 5, wherein the backlight module further comprises a reflective sheet arranged below a bottom of the light guiding plate.

7. The backlight module claimed in claim 6, wherein the backlight module further comprises at least one optical film arranged above a top surface of the light guiding plate.

8. A backlight module, comprising:
a LED light source arranged on a LED substrate, the LED light source comprises a plurality of LED lamps encapsulated by chip scale package (CSP); and
a lens bar configured in a front of the LED light source, the lens bar comprises a plurality of chambers, internal walls of the chambers are parabola-shaped curved surfaces, each of the LED lamps is arranged in a rim of a focal point formed by the parabola-shaped curved surface such that the curved surface above the LED lamp is symmetrical to the curved surface below the LED lamp, when the LED lamps emit light beams toward a plurality of directions, the chamber aggregates the light beams in the front of the chamber so as to be emitted out.

9. The backlight module claimed in claim 8, wherein the parabola-shaped curved surfaces are made by high-reflective-rate materials.

10. The backlight module claimed in claim 8, wherein the front of the lens bar is made by polymeric materials with high light transmittance.

11. The backlight module claimed in claim 10, wherein the front of the lens bar is made by PMMA or PC.

12. The backlight module claimed in claim 8, wherein the front of the lens bar is coated with a thin film for diffusing the light beams.

13. The backlight module claimed in claim 12, wherein the thin film is a transflective film.

14. The backlight module claimed in claim 8, wherein the backlight module further comprises a light guiding plate arranged in a rim of a lateral side of the lens bar.

15. The backlight module claimed in claim 14, wherein the backlight module further comprises a reflective sheet arranged below a bottom of the light guiding plate.

16. The backlight module claimed in claim 15, wherein the backlight module further comprises at least one optical film arranged above a top surface of the light guiding plate.

17. A liquid crystal device (LCD) comprises the backlight module in claim 8.

* * * * *